(No Model.) 4 Sheets—Sheet 1.
L. C. FARMER.
TYPE WRITING MACHINE.
No. 317,753. Patented May 12, 1885.
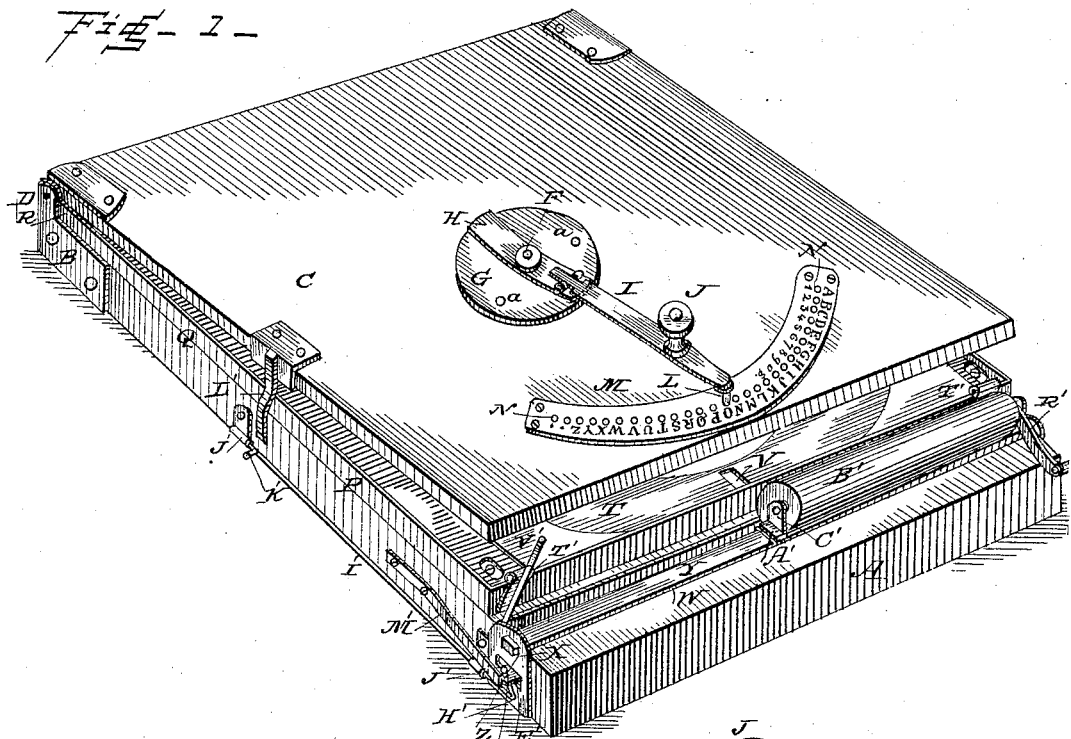
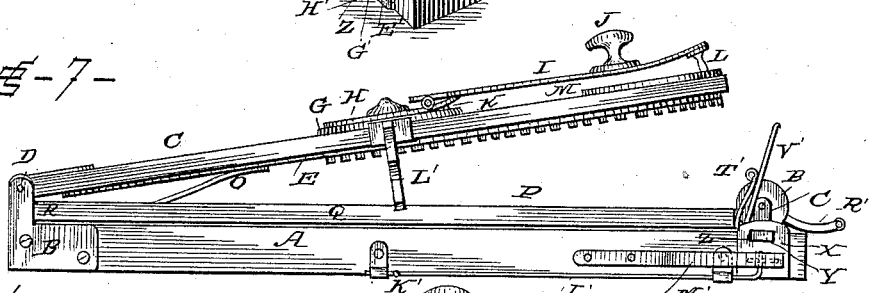
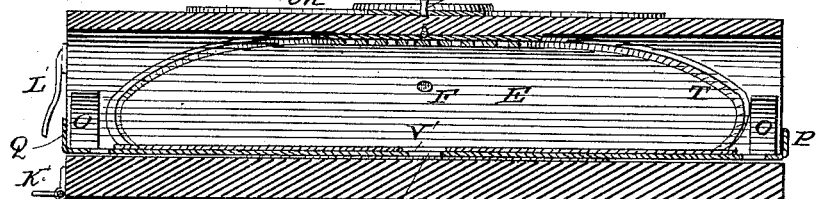
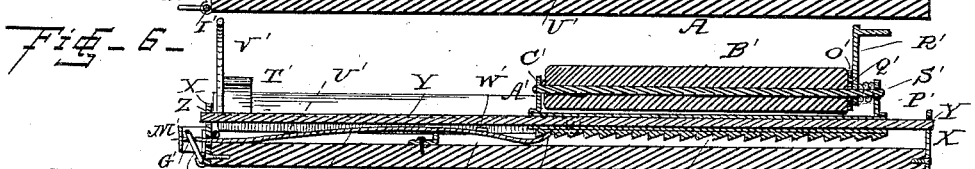
WITNESSES: Fred G. Dieterich, Wm. Bagger
INVENTOR. Luther C. Farmer
by Louis Bagger & Co.
ATTORNEYS.

(No Model.) 4 Sheets—Sheet 2.
L. C. FARMER.
TYPE WRITING MACHINE.
No. 317,753. Patented May 12, 1885.
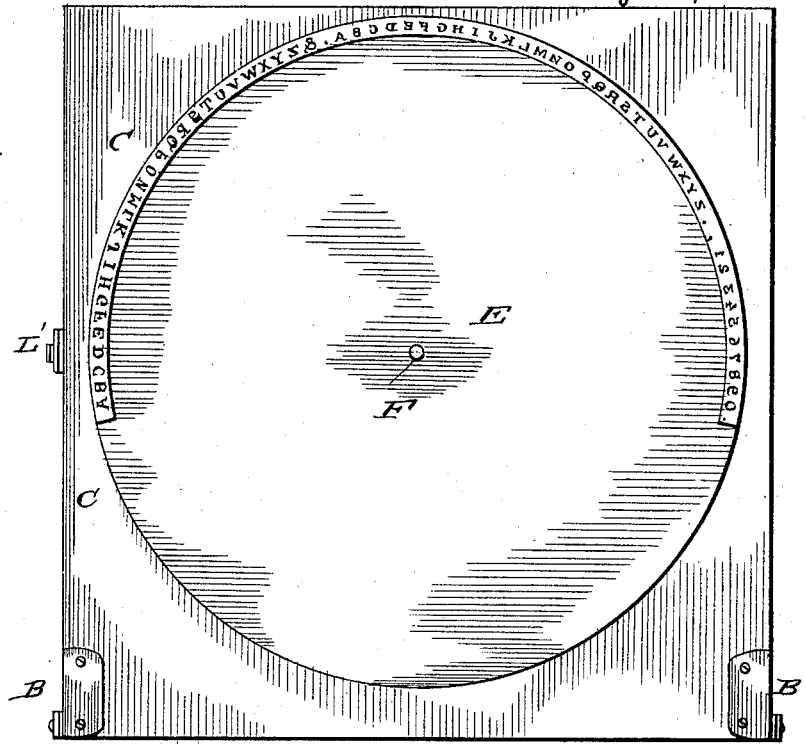
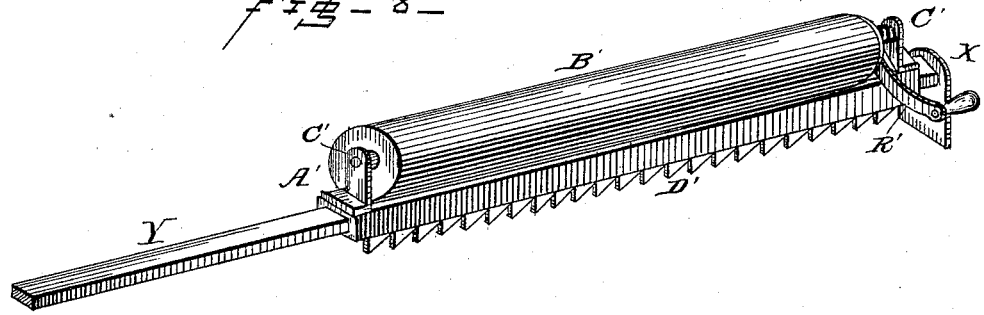
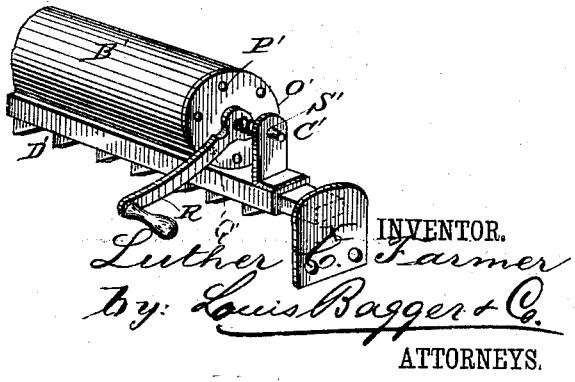
WITNESSES:
Fred. G. Dieterich
Wm. H. Bagger
INVENTOR.
Luther C. Farmer
by Louis Bagger & Co.
ATTORNEYS.

(No Model.) 4 Sheets—Sheet 3.
L. C. FARMER.
TYPE WRITING MACHINE.
No. 317,753. Patented May 12, 1885.
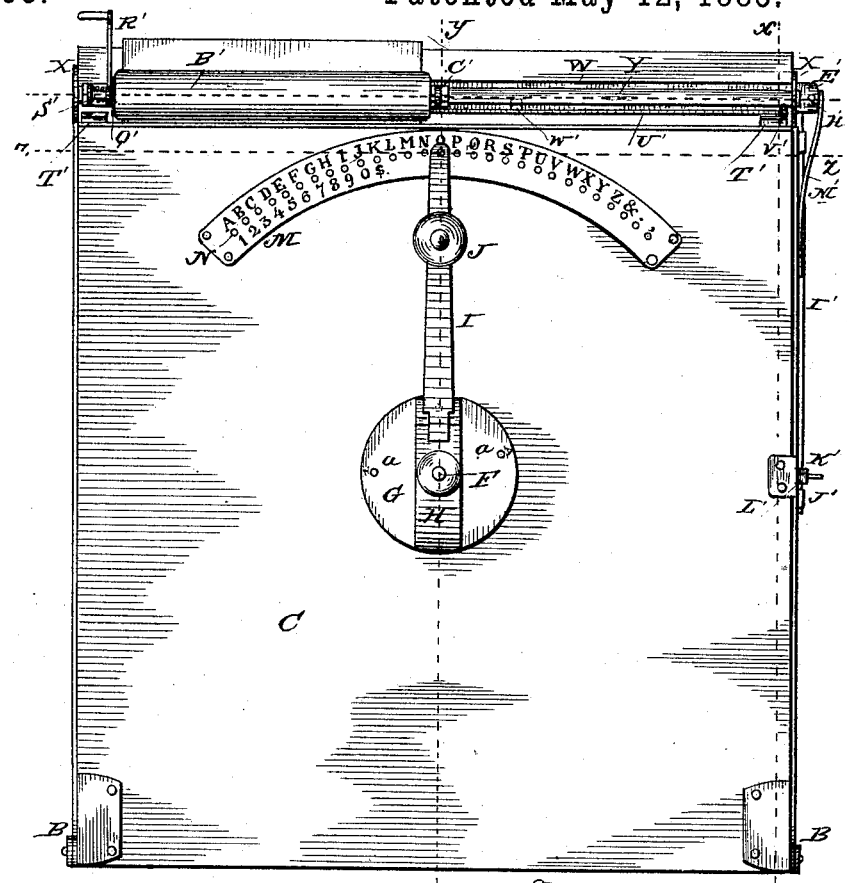
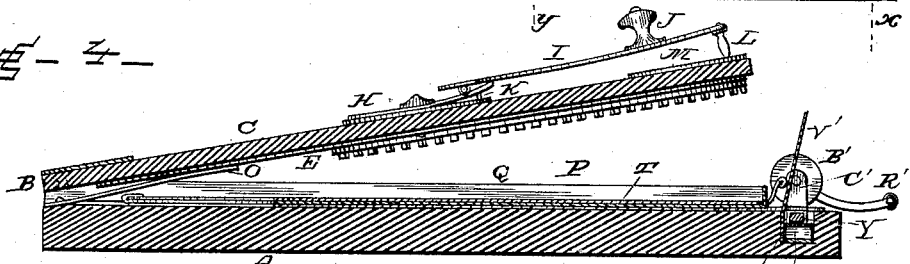
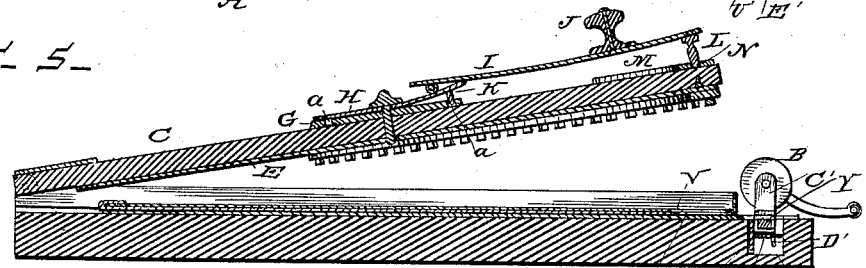
WITNESSES:
Fred. G. Dieterich.
Wm. H. Bagger.
INVENTOR,
Luther C. Farmer,
by Louis Bagger & Co.
ATTORNEYS.

(No Model.)　　　　　　　　　　　　　　　　4 Sheets—Sheet 4.
L. C. FARMER.
TYPE WRITING MACHINE.

No. 317,753.　　　　　　　　Patented May 12, 1885.

WITNESSES:　　　　　　　　　　INVENTOR.
Fred. G. Dieterich　　　　　　　Luther C. Farmer
Wm. Bagger.　　　　　　　by Louis Bagger & Co.
　　　　　　　　　　　　　　　　　ATTORNEYS.

N. PETERS, Photo-Lithographer, Washington, D. C.

UNITED STATES PATENT OFFICE.

LUTHER C. FARMER, OF MINNEAPOLIS, MINNESOTA.

TYPE-WRITING MACHINE.

SPECIFICATION forming part of Letters Patent No. 317,753, dated May 12, 1885.

Application filed June 12, 1884. (No model.)

*To all whom it may concern:*

Be it known that I, LUTHER C. FARMER, a citizen of the United States, and a resident of Minneapolis, in the county of Hennepin and State of Minnesota, have invented certain new and useful Improvements in Type-Writers; and I do hereby declare that the following is a full, clear, and exact description of the invention, which will enable others skilled in the art to which it appertains to make and use the same, reference being had to the accompanying drawings, which form a part of this specification, and in which—

Figure 10:
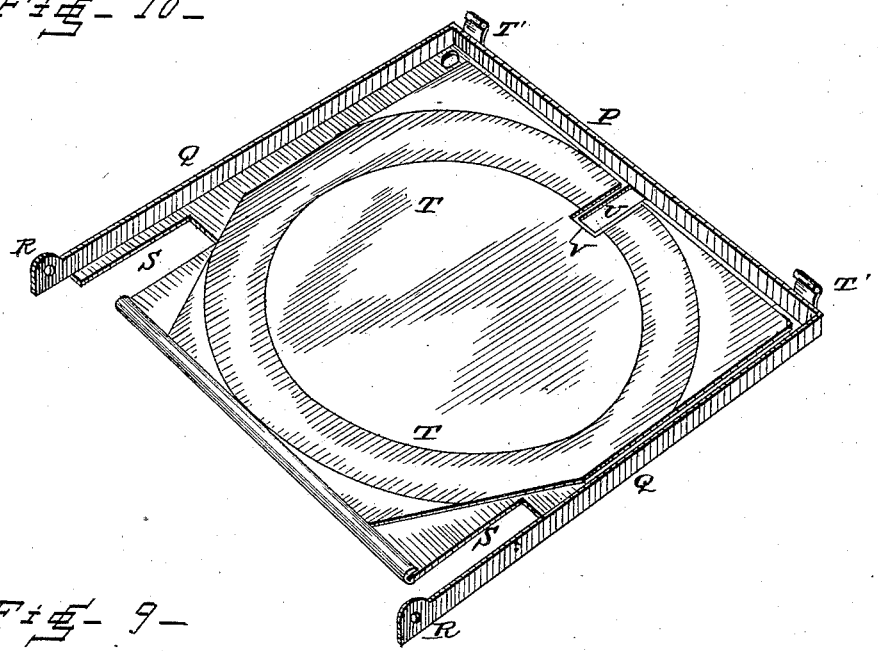
Figure 9:
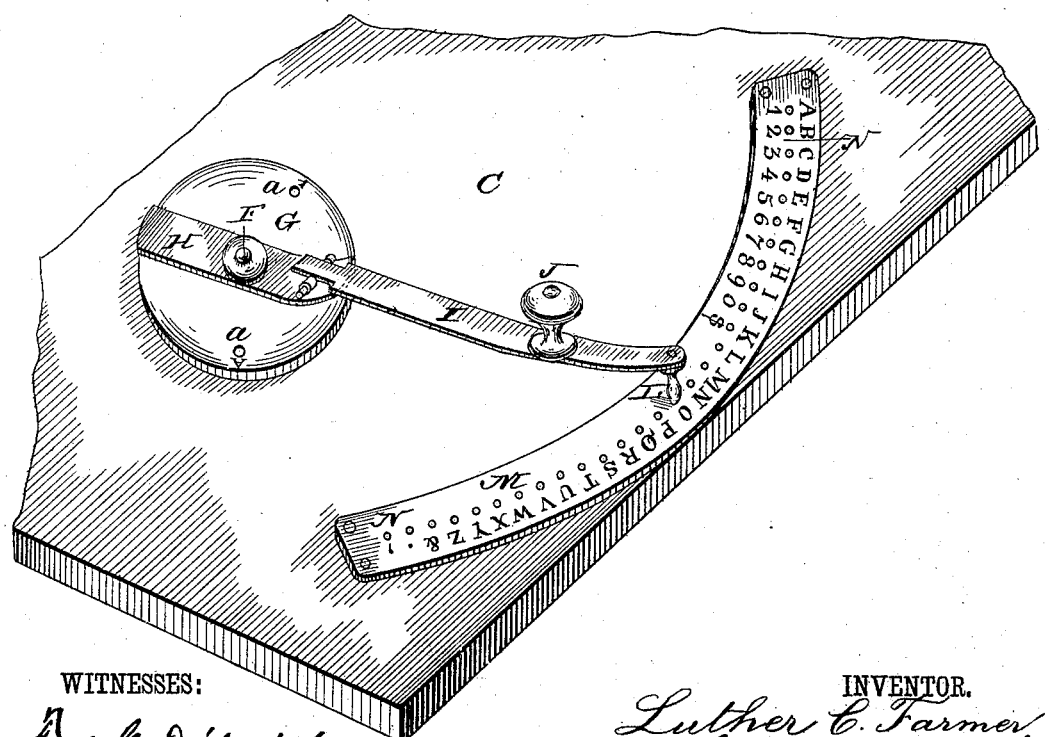

Figure 1 is a perspective view of my improved type-writer, showing the cover of the same in its raised position. Fig. 2 is a plan view, showing the under side of the revolving type-disk. Fig. 3 is a plan view of the machine in position for operation. Fig. 4 is a sectional view taken on the line $xx$ in Fig. 3. Fig. 5 is a sectional view taken on the line $y\ y$ in Fig. 3. Fig. 6 is a transverse sectional view taken through the feed-roller and feed mechanism. Fig. 7 is a side view of the machine, showing the same in position for operation. Fig. 8 is a perspective view of the rack-bar or feed mechanism detached from the machine. Fig. 9 is a perspective view illustrating the mechanism whereby the operating-handle is adjustably connected with the type-disk. Fig. 10 is a detail view of the pan or box containing the inking-pad. Fig. 11 is a transverse sectional view taken on the line $zz$ in Fig. 3. Fig. 12 is a detail view in perspective of the feed-roller with its operating-handle.

The same letters refer to the same parts in all the figures.

This invention relates to type-writing machines; and it has for its object to provide a machine which shall be simple in construction, durable, easily operated or manipulated, and of lower cost of manufacture than those which are now commonly used.

To this end it consists in the improved construction, arrangement, and combination of parts, which will be hereinafter fully described, and particularly pointed out in the claims.

In the drawings, A designates the base of the machine, which consists of an ordinary board or plate of suitable dimensions. The rear edges of the said base are provided with hinges B, between which a suitable top plate, C, is mounted upon pins or pivots D.

E is a circular disk mounted upon a spindle or axle, F, which is journaled centrally in the top plate, C, and to the upper end of which a smaller circular disk, G, is firmly secured, provided with perforations $a$. The upper end of the spindle F is provided with a loosely-journaled spring or plate, H, one end of which is provided with a hinged arm or lever, I, having a suitable handle, J, by means of which it may be easily turned to any desired position. The outer end of the spring H is provided with a downwardly-extending lug or stud, K, adapted to engage any one of the perforations in the plate G, to which reference has already been made. The upper end of the arm or lever I has a downwardly-extending pointed stud, L, the functions of which will presently be made apparent.

The circular type-disk E is provided on its under side near its periphery with one or more alphabets or series of characters which it is desired to use, arranged consecutively, so that each one of the holes $a$ in the plate G will be on a radial line with the center of one of the series of characters.

The upper side of the hinged top plate or cover, C, is provided with a segmental plate, M, concentric with the fulcrum of the operating-lever I, and having a series of indentations, N N, adjoining which the letters of the alphabet and the characters used in the machine are engraved, or otherwise so formed as to be conspicuous and easily readable. It will be seen that by adjusting the lug of the spring H, carrying the operating-lever, in the proper recess of the plate G the said operating-lever will be made to register with the series of letters or characters upon the type-disk which it is desired to use at the time, and that by turning the lever and adjusting the point at the outer end of the same in the proper perforation or indentation in the plate M the desired letter or character corresponding with that which indicates such indentation will be carried to a certain point at the periphery of the type-disk.

O O are springs arranged at or near the hinged end of the top plate or cover, C, and adapted to hold the latter in a slightly raised position.

P designates the box or casing which contains the inking-pad. The said casing may be made of tin or other suitable sheet metal, and it is provided with flanges Q, extending rearwardly, so as to form hinges R, by means of which the said box or plate is connected with the hinge-plates B at the sides of the base-plate. The casing P is provided with slots S at its rear end, serving to accommodate the springs O and to enable the latter to play freely against the under side of the top or cover C.

T is the inking-pad, which consists simply of a piece of textile fabric placed loosely in the pan P, and having a circular edge to which the ink has been applied in suitable quantities to adhere to the letters and characters of the type-disk when the latter is revolved over the surface of the inking-pad. The upper front end of the pan P is provided with a notch or opening, U, a corresponding slot, V, being formed in the edge of the inking-pad. This slot and notch are so arranged or located that they will register with the letter or character of the type-disk of which it is desired to make an impression, such letter or character having been brought to the required position by means of the operating-lever I, the construction and operation of which have been already described.

The upper end of the base-board A extends some distance in front of the top or cover C, and is provided with a transverse groove, W, at the ends of which plates X X are secured, which serve to retain in position a transverse bar, Y, fitted in recesses or openings Z in the said plates, whereby the said bar is raised some distance above the bottom of the groove W. This bar forms a track or guide for the carriage A', which carries the feed-roller B', the latter being journaled in the vertical end pieces, C', of the said carriage. The latter is provided on its under side with a ratchet-bar, D', adapted to engage a suitably-arranged spring, whereby the carriage may be moved or fed laterally the space of one ratchet at each operation, it being understood of course that the distance which the carriage is moved by each such operation shall be equal to the distance at which the letters or characters upon the type-disk are placed from each other, the purpose being to move the paper carried by the feed-roller a sufficient distance at each operation of the machine to cause the imprints to be the proper distance apart.

The spring E', which serves to operate the carriage A', is a simple flat spring arranged in the bottom of the groove W, and having one end turned upwardly, as at F', so as to engage the ratchet-bar upon the under side of the carriage. The outer end of the said spring, which extends through a slot or opening in one of the plates X, has an opening or perforation, G', adapted to receive the end of a crank, H', formed at one end of a rock-shaft, I', which is journaled in suitable bearings, J', at one side of the base-board A. The rear end of the said rock-shaft is provided with an outwardly-extending arm, K', adapted to be operated by means of an arm, L', extending downwardly from one side of the hinged cover C of the machine.

M' is a spring attached to the side of the base A and bearing against the outer end of the spring E', by which the carriage is operated.

The operation of this portion of the feed mechanism will be easily understood. It will be seen that the cover or top plate of the machine is normally held in a slightly-raised position by means of the springs at the hinged end of the same. By depressing the cover, as it is necessary to do in the act of making an impression, the arm L' will engage the arm K' extending from the rock-shaft, as described. The rock-shaft will thus be turned and draw the operating-spring E' in an outward direction, without, however, affecting the position of the carriage. When the impression has been made and the pressure upon the cover C is released, the rock-shaft will resume its normal position, owing to the action of the spring M', which at the same time serves to force the spring E in an inward direction, thus feeding the carriage forward for the space of one tooth or ratchet.

The inner end of the feed-roller is provided with a disk or plate, O', having a series of equidistant perforations, P', adapted to engage a pin or stud, Q', upon the side of a lever or crank, R', which is journaled loosely upon the shaft S' of the said feed-roller. It will be seen that by properly manipulating the said lever or handle the said roller may be revolved for any desired distance, so as to feed the paper forward in order to form the line-spaces.

The pan P, which contains the inking-pad, is provided at its front or upper end with suitably-arranged spring-catches T', by means of which it may be connected with the top plate or cover, C, so as to partake of the motion of the latter when the machine is operated.

It has been already described how the carriage carrying the feed-roller is fed in an inward direction for the purpose of forming the letter-spaces. In order to move the carriage back for the purpose of starting a new line, it is obviously necessary to disengage the operating-spring E' from the ratchet-bar upon the under side of the carriage. This is accomplished by means of a flat plate or lever, U', which is pivoted in one side of the groove W, and provided at its outer end with an upwardly-extending handle, V'. The said plate or lever is also provided with an inwardly-projecting lug or stud, W', resting upon the upper side of the said operating-spring E'. It will be seen that by depressing the outer end of the said lever the spring E' is depressed, thus enabling the carriage to be moved to the point at which it is desired to commence the writing.

The method of inserting the paper in the machine is as follows: The cover C, together with the pan P, is raised to such a position that a sheet of paper of the proper size may be placed upon the base under the edge of the roller, by revolving which latter the paper may be carried forward between the said roller and carriage. The operating-lever is then adjusted in such a position with relation to the disk G as to register with the series of letters or characters which it is desired to use. It is then brought to register with the proper indentation in the segmental letter-plate, after which the top plate is depressed, thus making an impression upon the sheet of paper, which has been made to register with the slot or opening in the pan P, through which the impression is made. When pressure upon the cover C is released, the feed mechanism already described, and operated by the spring M', is thrown into operation and serves to feed the carriage for the space of one letter. The type-disk is then again revolved by means of the operating-lever, and the operation repeated.

In order to change from one alphabet or series of characters to another, it is only necessary to adjust the operating-lever, which may be instantaneously done in the manner herein described.

It is obvious that the type-disk in revolving over the inking-pad is freely charged with ink from the latter, so that the impressions will always be clear and distinct.

Having thus described my invention, I claim and desire to secure by Letters Patent of the United States—

1. In a type-writer constructed substantially as described, the combination, with the base-board and the hinged cover, of the hinged inking-box having slots at its inner end to admit springs attached to the base-board and bearing against the under side of the cover, which is thereby held in a slightly-raised position, substantially as set forth.

2. In a type-writer, the combination, with a base-board, of a hinged top plate or cover carrying a revolving type wheel or disk, the shaft of which is provided at its upper end with a disk provided with indentations which register with the several series of letters or characters formed upon or attached to the periphery of the said type-disk, and a spring or plate mounted loosely upon the said shaft and having a hinged operating-lever and a downwardly-projecting lug or stud adapted to engage any one of the indentations in the said top disk, substantially as set forth.

3. In a type-writer, the combination, with a base-board having a hinged top plate or cover carrying a revolving type wheel or disk and having suitable inking mechanism for the latter, substantially as described, of a lever hinged to a spring which is connected adjustably with a disk mounted upon the upper end of the shaft of the type-wheel, and a segmental letter-plate secured upon the upper side of the hinged top plate and having a series of indentations registering, as herein described, with the letters and characters of the type-wheel and adapted to engage a pointed lug or stud extending downwardly from the outer end of the operating-lever, substantially as set forth.

4. In a type-writer constructed substantially as described, the combination, with the base-board having a hinged cover carrying the printing and inking mechanism, of a feed-roller mounted in a carriage sliding upon a guide-bar which is secured in a transverse groove at the front end of the said base-board, substantially as set forth.

5. In a type-writer constructed substantially as described, the combination, with the transverse guide-bar arranged in a groove at the front end of the base-board of the machine, of a carriage sliding upon the said bar and carrying the feed-roller and having on its under side a ratchet-bar, a flat spring arranged in the bottom of the said groove and having an upturned inner end forming a dog or pawl, a rock-shaft, and a spring, substantially as set forth.

6. The combination, with the carriage sliding transversely upon a guide-bar arranged in a suitable groove, of the feed-roller mounted in the said carriage and having at one end a disk provided with a series of equidistant indentations, and a crank or lever journaled loosely upon the shaft or axle of the said feed-roller and having a laterally-projecting pin or stud adapted to engage the indentations in the disk at the end of the said roller, substantially as set forth.

7. The combination, with the carriage carrying the feed-roller and sliding upon a transverse bar arranged in a groove at the front end of the machine, of the feed-spring having an upturned inner end forming a dog or pawl that engages a ratchet-bar upon the under side of the carriage, and a flat plate or lever hinged or pivoted to one side of the groove and having an upwardly-extending arm or handle at its free end, and provided with an inwardly-extending lug or stud resting on the upper side of the operating-spring, which may be thereby depressed, so as to release it from the ratchet-bar of the carriage, substantially as and for the purpose set forth.

8. In a type-writer of the class herein described, the combination, with the base-board having a feed-carriage traveling upon a transverse bar or guide at its front end and operated by the action of a flat spring, arranged and operating substantially as described, of a rock-shaft journaled to one side of the base-board and having an arm or crank at one end engaging the said operating-spring and provided at its other or inner end with an arm or crank operated by an arm extending downwardly from one side of a cover, which is hinged to the said base-board and which carries the type wheel or disk and inking mechanism for the same, substantially as set forth.

9. In a type-writer, the combination, with a base-board provided at its upper or front end with a laterally-movable carriage having mechanism, substantially as described, for feeding the paper in an inward direction, of a hinged top plate or cover carrying the printing and inking mechanism and normally held in a slightly-raised position by springs, whereby, when the said top plate is depressed in the act of forming an impression, it shall serve to retain the paper securely in position, while at the moment the pressure is released the paper shall be simultaneously and instantly released, so as to enable it to move or travel with the carriage to the required position where it is to receive the next impression, substantially as set forth.

In testimony that I claim the foregoing as my own I have hereunto affixed my signature in presence of two witnesses.

LUTHER C. FARMER.

Witnesses:
  I. ATWATER,
  CHARLES H. BABCOCK.